United States Patent
Heinrichs et al.

(10) Patent No.: US 9,077,203 B2
(45) Date of Patent: *Jul. 7, 2015

(54) ASSEMBLY WITH AT LEAST TWO POWER SUPPLY UNITS AND AT LEAST ONE POWER-CONSUMING COMPONENT, COMPUTER SYSTEM AND METHOD FOR CONTROL OF AN ASSEMBLY

(75) Inventors: Hans-Jürgen Heinrichs, Altenbeken (DE); Manfred Götz, Brakel (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 758 days.

This patent is subject to a terminal disclaimer.

(21) Appl. No.: 13/132,238

(22) PCT Filed: Nov. 30, 2009

(86) PCT No.: PCT/EP2009/066068
§ 371 (c)(1),
(2), (4) Date: Jul. 14, 2011

(87) PCT Pub. No.: WO2010/076106
PCT Pub. Date: Jul. 8, 2010

(65) Prior Publication Data
US 2011/0264952 A1 Oct. 27, 2011

(30) Foreign Application Priority Data
Dec. 8, 2008 (DE) .......................... 10 2008 061 034

(51) Int. Cl.
| | |
|---|---|
| *H02J 3/14* | (2006.01) |
| *H02J 1/14* | (2006.01) |
| *G06F 1/28* | (2006.01) |
| *G06F 1/30* | (2006.01) |

(52) U.S. Cl.
CPC ... *H02J 1/14* (2013.01); *G06F 1/28* (2013.01); *G06F 1/30* (2013.01); *H02J 3/14* (2013.01)

(58) Field of Classification Search
CPC ........................................................ G06F 1/02
USPC ............................................ 713/100; 707/14
See application file for complete search history.

(56) References Cited

U.S. PATENT DOCUMENTS

| | | |
|---|---|---|
| 5,761,084 A | 6/1998 | Edwards |
| 6,345,369 B1 * | 2/2002 | Kitamorn et al. ............... 714/14 |
| 6,625,736 B1 | 9/2003 | Berthaud et al. |

(Continued)

FOREIGN PATENT DOCUMENTS

| | | |
|---|---|---|
| EP | 1555595 A2 | 7/2005 |
| JP | 09-204240 A | 8/1997 |

(Continued)

*Primary Examiner* — Jaweed A Abbaszadeh
*Assistant Examiner* — Alyaa T Mazyad
(74) *Attorney, Agent, or Firm* — DLA Piper LLP (US)

(57) ABSTRACT

An assembly includes a plurality of power supply units for producing an output-side operating voltage from at least one input-side supply voltage and at least one power-consuming component which is electrically coupled to the plurality of power supply units. The assembly has a controller arranged to monitor the function of the plurality of power supply units and to switch the power-consuming from a normal operating mode into a restricted operating mode, whose power consumption is lower than that of the first operating mode, when at least one power supply unit fails or to activate a previously deactivated power supply unit.

16 Claims, 4 Drawing Sheets

(56) References Cited

U.S. PATENT DOCUMENTS

| | | |
|---|---|---|
| 7,013,399 B2 * | 3/2006 | Sisler et al. ................ 713/310 |
| 7,529,949 B1 * | 5/2009 | Ranganathan et al. ....... 713/300 |
| 2005/0044453 A1 | 2/2005 | Dunstan et al. |
| 2005/0144491 A1 | 6/2005 | Zayas |
| 2005/0172157 A1 * | 8/2005 | Artman et al. ............... 713/300 |
| 2006/0161794 A1 | 7/2006 | Chiasson et al. |
| 2006/0174143 A1 * | 8/2006 | Sawyers et al. ............. 713/300 |
| 2006/0274764 A1 | 12/2006 | Mah et al. |
| 2007/0180117 A1 | 8/2007 | Matsumoto et al. |
| 2007/0250218 A1 | 10/2007 | Culley |
| 2007/0278020 A1 * | 12/2007 | Harris et al. ............... 178/18.01 |
| 2008/0028244 A1 | 1/2008 | Capps et al. |
| 2008/0178019 A1 | 7/2008 | McGrane et al. |

FOREIGN PATENT DOCUMENTS

| | | |
|---|---|---|
| JP | 2002-189540 A | 7/2002 |
| JP | 2005-202506 A | 7/2005 |
| JP | 2008-258377 A | 10/2008 |

* cited by examiner

ASSEMBLY WITH AT LEAST TWO POWER SUPPLY UNITS AND AT LEAST ONE POWER-CONSUMING COMPONENT, COMPUTER SYSTEM AND METHOD FOR CONTROL OF AN ASSEMBLY

RELATED APPLICATIONS

This is a §371 of International Application No. PCT/EP2009/066068, with an International filing date of Nov. 30, 2009 (WO 2010/076106 A1), published Jul. 8, 2010), which is based on German Patent Application No. 10 2008 061 034.8, filed Dec. 8, 2008.

TECHNICAL FIELD

This disclosure relates to an assembly comprising at least two power supply units for producing an output-side operating voltage from at least one input-side supply voltage and at least one power-consuming component which is electrically coupled to the at least two power supply units. In addition, disclosure relates to a computer system comprising such an assembly and to a method for controlling an assembly having a power-consuming component and at least two power supply units for providing an operating voltage for the power-consuming component.

BACKGROUND

Assemblies having at least two power supply units for producing an operating voltage for at least one power-consuming component are widely known. In the field of high-performance or high-availability servers in particular, power supply units are frequently designed in a redundant manner, with the result that it is still possible to operate the computer system even when one or possibly more power supply units fail. In addition, further assemblies having redundant power supply units are known, for example, from the field of telecommunications and control and monitoring systems.

The number and performance of the redundant power supply units may be different depending on the power consumption of the power-consuming component. In particular, more than one high-performance redundant power supply unit is often provided in this case in so-called "high-availability" systems.

The known assemblies have two fundamental disadvantages. On the one hand, each power supply unit must be designed to be more powerful than is necessary for normal operation. Only in this manner can it be ensured that the remaining power supply units are not loaded beyond their maximum output power even when a power supply unit fails. This leads, inter alia, to increased costs of the assembly since particularly powerful power supply units are more expensive than medium-performance or lower-performance power supply units.

In addition, all power supply units in the known assemblies are generally active and contribute to supplying the power-consuming component. Consequently, each power supply unit is operated well below its maximum rated output power during normal operation. However, this reduces the energy efficiency in the case of switched-mode power supplies and similar converter circuits for producing an output-side operating voltage from at least one input-side supply voltage. This is because it is advantageous to operate a power supply unit in the vicinity of its maximum output power to achieve the highest possible efficiency.

It could therefore be helpful to describe an assembly of the type mentioned above, a computer system having such an assembly and a method for controlling the latter, which assembly solves or diminishes the above-mentioned problems. In this case, the failure safety of the assembly as a whole and, in particular, the power supply for the power-supplying component should be ensured even when at least one power supply unit fails. The energy balance should advantageously be improved in comparison with known assemblies. In addition, the assembly should have the simplest possible construction and be able to be produced in a cost-effective manner.

SUMMARY

An assembly includes a plurality of power supply units that produce an output-side operating voltage from at least one input-side supply voltage, at least one power-consuming component operable in at least one normal operating mode with a first power consumption and operable in a restricted operating mode with at least one second power consumption which is lower than the first power consumption, the power consuming component being electrically coupled to the plurality of power supply units, and the first power consumption of the power-consuming component in the normal operating mode being lower than combined output power of the at least two power supply units, wherein a first subgroup of power supply units provides power required in the normal operating mode, and a second, smaller subgroup of power supply units provides power required in the restricted operating mode, and a controller coupled to the plurality of power supply units and the power-consuming component and arranged to monitor at least one function of the plurality of power supply units and deactivate at least one power supply unit if at least one power supply unit is not needed to provide power required in the normal operating mode, the controller switching the power-consuming component from the normal operating mode into the restricted operating mode upon failure of at least one power supply unit in the first subgroup if the combined output power of the remaining power supply units is lower than the first power consumption in the normal operating mode of the power-consuming component, wherein power consumption of the power-consuming component is at least temporarily reduced.

A computer system including at least one assembly and at least one management component coupled to the controller and signals a fault state when at least one power supply component fails.

A method for controlling an assembly having a power-consuming component and a plurality of power supply units for providing an operating voltage for the power-consuming component, a first power consumption of the power-consuming component in a normal operating mode being lower than the combined output power of the plurality of power supply units, wherein a first subgroup of power supply units provides power for the normal operating mode, and a second, smaller subgroup of power supply units provides power for the restricted operating mode, including deactivating at least one power supply unit if the power supply unit is not needed to provide power required in the normal operating mode, monitoring the plurality of power supply units for failure by at least one monitoring apparatus, causing the at least one monitoring apparatus to generate a predetermined control signal if failure of at least one active power supply unit has been detected, and switching the power-consuming component from the normal operating mode with the first power consumption into a restricted operating mode with a second, lower power consumption if the predetermined control signal has been detected and combined output power of the remaining power supply units is lower than the first power consumption in the normal operating mode of the power-consuming component, wherein the power consumption of the power-consuming component is at least temporarily reduced.

LIST OF REFERENCE SYMBOLS

1 Power supply unit
2 Voltage input
3 Supply voltage
4 Converter circuit
5 Monitoring circuit
6 Voltage output
7 Power supply line
8 Power-consuming component
9 (Primary) clock generation circuit
10 Interrupter
11 Control line
12 Computer system
13 Supply component
14 Computer unit
15 Data network
16 Remote maintenance system
17 Processor
18 Communication apparatus
19 Management component
30 Data bus
31 Voltage monitoring circuit
32 Voltage divider
33 Comparator
34 Processor core
35 (Secondary) clock generation circuit
36 Control circuit

DETAILED DESCRIPTION

We provide an assembly comprising a plurality of power supply units for producing an output-side operating voltage from at least one input-side supply voltage and at least one power-consuming component. The power-consuming component can be operated in at least one normal operating mode with a first power consumption and can be operated in a restricted operating mode with at least one second power consumption which is lower than the first power consumption. The power-consuming component is electrically coupled to the plurality of power supply units, and the first power consumption of the power-consuming component in the normal operating mode is lower than the combined output power of the plurality of power supply units. The result is that a first subgroup of power supply units suffices to provide the power required in the normal operating mode, and a second, smaller subgroup of power supply units, in particular an individual power supply unit (1A), suffices to provide the power required in the restricted operating mode. The assembly also comprises control means coupled to the plurality of power supply units and the power-consuming component and are set, up, to monitor the function of the plurality of power supply units and deactivate at least one power supply unit if this power supply unit is not needed to provide the power required in the normal operating mode. The control means is also set up to switch the power-consuming component from the normal operating mode into the restricted operating mode when at least one power supply unit in the first subgroup fails if the combined output power of the remaining power supply units is lower than the first power consumption in the normal operating mode of the power-consuming component. The result is that the power consumption of the power-consuming component is at least temporarily reduced.

Such an assembly has the advantage that, even when a plurality of redundant power supply units having a total power that is not normally needed are provided, efficient operation of the individual power supply units in the vicinity of their maximum output power can be ensured. Such an assembly has the advantage that, even when a plurality of redundant power supply units having a total power that is not normally needed are provided, efficient operation of the individual power supply units in the vicinity of their maximum output power can be ensured. For example, it is possible to provide three power supply units which each providing an output power of approximately 50% of the required power consumption in the normal operating mode. Two of the three power supply units are normally used to supply the power-consuming component in the normal operating mode, but, in the event of a fault in two power supply units, only the remaining third power supply unit is used to supply the power-consuming component in the restricted operating mode. The use of control means which switch the power-consuming component into a restricted operating mode with a lower power consumption when at least one power supply unit fails allows further power supply units to be dispensed with or allows correspondingly larger dimensioning of existing power supply units while simultaneously ensuring that the power-consuming component is supplied with power.

The control means may also be set up to activate the at least one deactivated power supply unit when at least one active power supply unit fails to supply the power-consuming component with the required power in the normal operating mode. Such a configuration allows the assembly to be operated without interruption whilst simultaneously maintaining its energy efficiency.

The control means may comprise at least one monitoring apparatus for generating a predetermined control signal when at least one power supply unit fails and a throttle apparatus which is coupled to the monitoring apparatus and is intended to throttle the power-consuming component when the control signal is received. The use of a monitoring apparatus for monitoring the power supply units, on the one hand, and of a throttle apparatus for throttling the power-consuming component, on the other hand, enables a particularly simple, modular design of the control means. In particular, already existing monitoring apparatuses of the power supply units and/or throttle apparatus of the power-consuming component can be used to implement the control means.

The power-consuming component may comprise a processor core and the throttle apparatus comprises a clock generation circuit to supply the processor core with an operating clock, the processor core supplied with a first operating clock in the normal operating mode by the clock generation circuit and supplied with a second, lower operating clock in the restricted operating mode. The power consumption of the power-consuming component can be easily reduced by appropriately driving or connecting a clock generation circuit for a processor core.

The processor core and the clock generation circuit may be arranged in a processor, the processor having at least one connection pin to apply the predetermined control signal. A connection pin can be used to easily supply an external control signal to an internal clock generation circuit of a process.

Each of the at least two power supply units may comprise a monitoring apparatus which is intended to monitor a permissible output power or a permissible output current and is set up to generate the predetermined control signal upon detecting that the permissible output power or the permissible output current has been exceeded. A monitoring apparatus which is integrated in the power supply unit and intended to monitor an output power or an output current can be used in a particularly simple manner to generate the required control signal.

The at least one monitoring apparatus may have a voltage monitoring circuit which is set up to compare the output-side operating voltage with a predetermined threshold value and to generate the predetermined control signal when the predetermined threshold value is undershot. Such a voltage monitoring circuit allows a voltage drop associated with failure of a power supply unit to be determined in a simple and rapid manner.

We also provide a computer system comprising at least one assembly according to one of the above-mentioned examples and at least one management component which is coupled to the control means and set up to signal a fault state when at least one power supply component fails. As a result of the fact that a management component which is coupled to the control means signals a fault state, the computer system can react to the failure of the power supply unit.

The management component may be coupled to a remote maintenance system via a communication apparatus and is set up to signal the fault state to the remote maintenance system. A system administrator of the computer system can be advised of the failure of the power supply unit by virtue of the fault state being signaled to a remote maintenance system.

The management component is may be set up to change a configuration of the computer system upon signaling the fault state to reduce a power consumption of the computer system. The power consumption of the computer system can be adapted to the changed output power of the power supply units by reconfiguring the computer system.

The management component may be set up to reset the control means after changing the configuration to switch the power-consuming component back from the restricted operating mode into the normal operating mode. If the configuration of the computer system has been changed in such a manner that the computer system can now also be operated in a reliable manner without the failed power supply unit, the power-consuming component can be switched back into the normal operating mode.

The computer system may be characterized in that the at least two power supply units together have an output power which substantially corresponds to the first power consumption of the computer system in the normal operating mode. The power supply units can be operated at an operating point with optimum efficiency by dimensioning the power supply units in accordance with the power consumption of the computer system in the normal operating mode. Furthermore, it is possible to dispense with using expensive, over-dimensioned power supply units.

The computer system may be characterized in that each of the at least two power supply units per se has an output power which substantially corresponds to the second power consumption of the computer system in the restricted operating mode. The computer system can continue to be operated in a reliable manner even when all of the power supply units, apart from one, fail by dimensioning the power supply units in accordance with the power consumption of the computer system in the restricted operating mode.

We further provide a method for controlling an assembly having a power-consuming component and a plurality of power supply units to provide an operating voltage for the power-consuming component, a first power consumption of the power-consuming component in a normal operating mode being lower than the combined output power of the plurality of power supply units. The result is that a first subgroup of power supply units suffices to provide the power required in the normal operating mode, and a second, smaller subgroup of power supply units, in particular an individual power supply unit, suffices to provide the power required in the restricted operating mode. The method has the following steps:

at least one power supply unit is deactivated if the power supply unit is not needed to provide the power required in the normal operating, mode, the plurality of power supply units are monitored for failure by at least one monitoring apparatus, the at least one monitoring apparatus generates a predetermined control signal if the failure of at least one active power supply unit has been detected, and the power-consuming component is switched from the normal operating mode with the first power consumption into a restricted operating mode with a second, lower power consumption if the predetermined control signal has been detected and the combined output power of the remaining power supply units is lower than the first power consumption in the normal operating mode of the power-consuming component, with the result that the power consumption of the power-consuming component is at least temporarily reduced.

The method may be characterized by an additional step in which the power-consuming component is switched back from the restricted operating mode into the normal operating mode if the at least one monitoring component has detected that the at least one previously failed power supply component is ready for operation again. As a result of the additional method step, the assembly can be automatically switched back into the normal operating mode when a temporary fault in a power supply unit has been eliminated.

Figure 1:
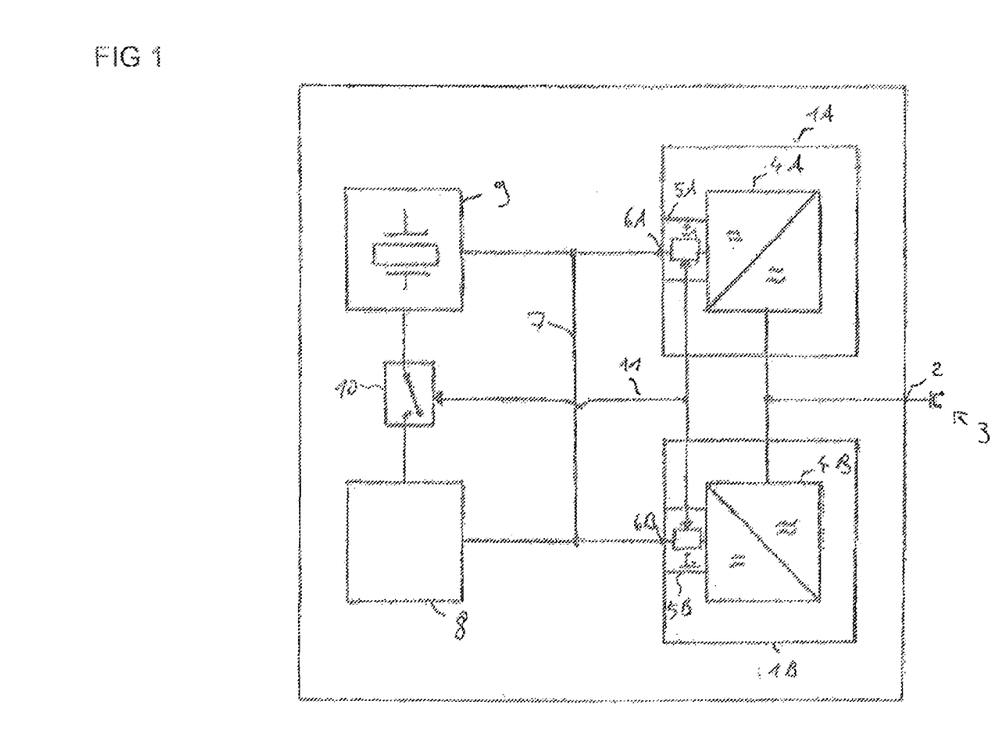
FIG. 1 shows a schematic illustration of an assembly comprising two power supply units and a power-consuming component.

Turning now to the drawings, FIG. 1 shows an assembly comprising two power supply units 1A and 1B. The maximum output power of the power supply units 1A and 1B is 100 Watts in each case. Both power supply units 1A and 1B are connected to a supply voltage 3, for example, a mains AC voltage of 235 volts, via a common voltage input 2.

Each of the power supply units 1A and 1B has a converter circuit 4A and 4B for producing an output-side DC voltage from the input-side supply voltage 3. For example, the converter circuits 4A and 4B may be switching converters which provide one or more stabilized output voltages of, for example, 3.3 volts, 5 volts and 12 volts for operating a computer system. To avoid damage to the converter circuit 4A and 4B, each of the power supply units 1A and 1B has a monitoring circuit 5A and 5B which monitors the output current of the converter circuit 4A and 4B.

A respective voltage output 6A and 6B of the first power supply unit 1A or 1B is coupled to a power supply line 7 of the assembly. The output voltage of the first and second power supply units 1A and 1B is supplied to a power-consuming component 8, for example, a processor of a computer system, and to a clock generation circuit 9 via the power supply line 7. The power-consuming component 8 and the clock generation circuit 9 together have an input power which substantially corresponds to the output power of the two power supply units 1A and 1B.

The clock generation circuit 9 is coupled to the power-consuming component 8 via an interrupter 10. The interrupter 10 is also coupled to the monitoring circuits 5A and 5B of the first power supply unit 1A and of the second power supply unit 1B via a control line 11. Providing a suitable control signal via the control line 11 thus makes it possible to temporarily prevent a clock signal from being supplied from the clock generation circuit 9 to the power-consuming component 8 or to reduce the frequency of the clock signal, which results in a rapid and considerable reduction in the power consumption of the power-consuming component 8. For example, the power consumption of the power-consuming component 8 can be halved in the region of a few milliseconds.

If one of the power supply units 1A or 1B fails in the example illustrated in FIG. 1, the output current at the power supply unit 1B or 1A which is still operating increases suddenly. If, for example, the first converter circuit 4A fails completely, the entire current for operating the power-consuming component 8 and the clock generation circuit 9 must be provided by the converter circuit 4B of the second power supply unit 1B. Consequently, the output current of the converter circuit 4B exceeds a predetermined limit value, with the result that the monitoring circuit 5B responds and transmits a control signal to the interrupter 10 via the control line 11. A control circuit which is arranged in the interrupter 10, for example, but is not illustrated in FIG. 1 ensures that the clock generation circuit 9 reduces the power consumption of the power-consuming component 8 at least temporarily within a very short time upon receiving the control signal. The interruption or reduction of the clock signal, in particular, is suitable for this purpose. This avoids the remaining power supply unit 1B being overloaded. At the same time, at least the instantaneous state of the power-consuming component 8 can be saved until further notice.

Figure 2:
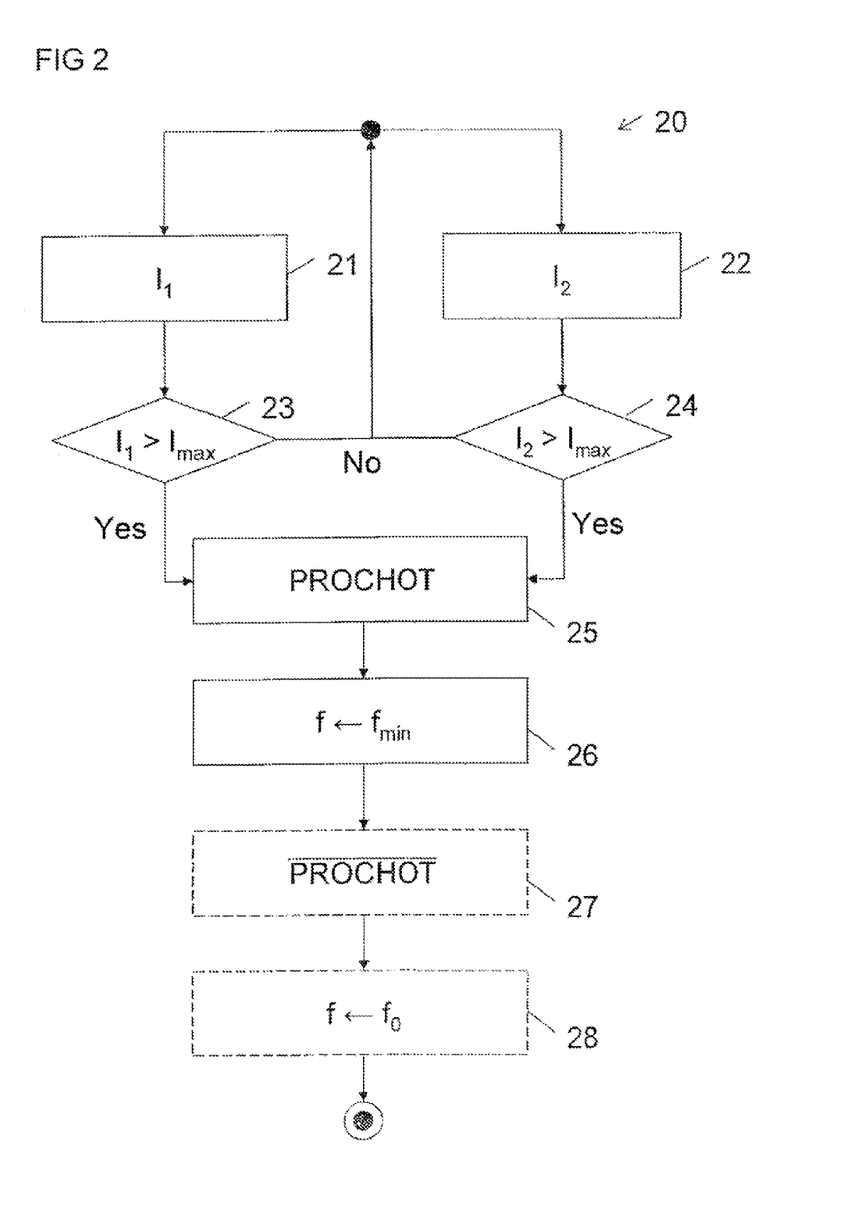
FIG. 2 shows a flowchart of a method for controlling an assembly.

Before further measures for operating the assembly in a restricted operating mode and measures for restoring the normal operating mode are described, the fundamental control method is explained using the flowchart in FIG. 2.

In steps 21 and 22, an output variable of a first power supply unit 1A and of a second power supply unit 1B is detected. This may be, for example, the instantaneous output current or an instantaneous output power of the respective power supply unit 1A or 1B. Alternatively, the level of an instantaneous operating voltage or another parameter may also be monitored.

In subsequent steps 23 and 24, a check is carried out to determine whether the detected parameter is above a respective limit value. On the basis of the example of FIG. 1, a check is carried out to determine whether the first output current $I_1$ or the second output current $I_2$ of the first power supply unit 1A or of the second power supply unit 1B is above a maximum permissible limit value $I_{max}$. If this is not the case, the method is continued again with steps 21 and 22.

If one of the detected parameters is above a permissible limit value, a suitable control signal is generated in a step 25. For example, a predetermined voltage potential may be transmitted to an external connection pin of a processor, for example the so-called "PROCHOT" pin which is usually used to signal a thermal overload situation.

In response to the control signal, a power-consuming component 8, for example a processor, reduces its power consumption. For example, an internal clock generation or duplication circuit may be configured in such a manner that a processor core is supplied only with a minimum operating clock at a frequency $f_{min}$. For example, the minimum operating clock may be only 12.5% of a fundamental frequency $f_0$ of the normal operating clock. This makes it possible to continue to operate a power-consuming component 8 in a restricted operating mode, even when a power supply device 1 fails, without the need for a redundant power supply device 1.

If all of the power supply units 1A and 1B are available again or if the power consumption of the assembly being monitored was reduced in another manner, the power-consuming component 8 can be switched back into the normal operating mode by a suitable control signal in an optional step 27. For example, the control signal at the connection pin PROCHOT can be withdrawn, with the result that the throttling of a processor core is canceled.

In step 28, the operating clock of the power-consuming component is then increased again to the normal frequency $f_0$ which is greater than the reduced frequency $f_{min}$.

Figure 3:
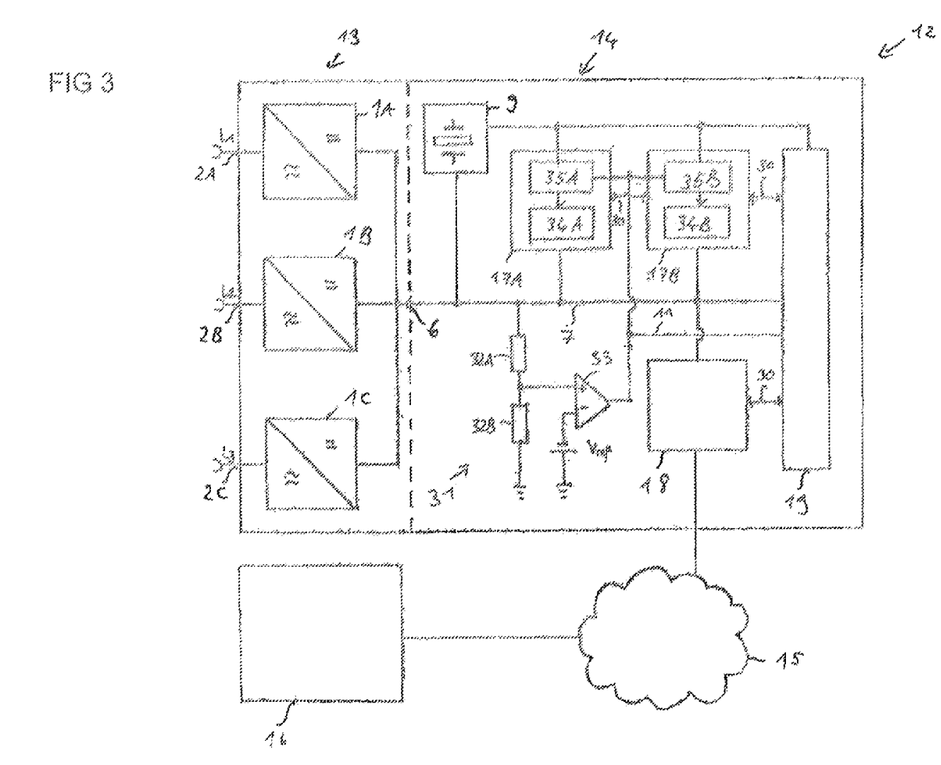
FIG. 3 shows a computer system having an assembly.

FIG. 3 shows a computer system 12 comprising a supply component 13 and a computer unit 14. The computer system 12 is connected to a remote maintenance system 16 via a data network 15.

The supply component 13 of the computer system 12 comprises three power supply units 1A to 1C connected to different phases of a multiphase power supply network by associated voltage inputs 2A to 2C. Each of the power supply units 1A to 1C comprises a converter circuit (not illustrated in FIG. 3) and converts the input-side supply voltage into an output-side DC voltage and provides it at a common voltage output 6 of the supply component 13.

The computer unit 14 of the computer system 12 is supplied with an operating voltage via the voltage output 6. In particular, the operating voltage is supplied to two processors 17A and 17B, to a communication apparatus 18, to a management component 19 and to a primary clock generation circuit 9 via a power supply line 7. The primary clock generation circuit 9 supplies the processors 17A and 17B and the management component 19 with an external clock signal.

Each of the processors 17A and 17B comprises a processor core 34A and 34B and a secondary clock generation apparatus 35A and 35B. For example, the secondary clock generation apparatus 35A and 35B is a clock ratio defining means or a clock multiplier which uses the external operating clock of the primary clock generation circuit 9 to produce an internal operating clock for the processor core 34A and 34B which is a multiple of the external operating clock. Other clock generation or conversion circuits which generate or define an internal operating clock of the processor cores 34A and 34B are possible.

The management component 19 is connected to the processors 17A and 17B and to the communication apparatus 18 via a data bus 30. The management component 19 can be used to interrogate and, if necessary, change operating states of the individual components of the computer unit 14. For example, the management component 19 is a so-called "service management" module on which a control program which is independent of the processors 17A and 17B and is intended to monitor the computer unit 14 runs. Alternatively, management software can also be executed on one of the processors 17A or 17B instead of a separate monitoring module. The communication apparatus 18 makes it possible to signal operating states and to also perform remote maintenance on the computer system 12 from the remote maintenance system 16 via the data network 15.

To ensure reliable operation of the computer unit 14 even when one of the power supply units 1A to 1C fails, for example on account of failure of one of the plurality of phase lines $L_1$ to $L_3$, the computer unit 14 has a voltage monitoring circuit 31 which monitors the operating voltage of the computer system 12, which voltage is emitted via the voltage output 6. In the example illustrated, the voltage monitoring circuit 31 comprises a voltage divider 32 comprising a first resistor 32A and a second resistor 32B which are connected between the power supply line 7 and a known reference potential, for example, ground. The center tap of the voltage divider 32 is connected to a comparator 33 which compares the voltage which has been tapped off with a fixed reference voltage $V_{ref}$. If the voltage of the power supply line 7 falls below a predetermined level, for example, because one of the three power supply units 1A to 1C fails, the comparator 33 generates a control signal at its output. The control signal from the comparator 33 is supplied both to the first and second processors 17A and 17B and to the management component 19 via a control line 11.

If the voltage monitoring circuit 31 detects a voltage drop on the power supply line 7 upon failure of the power supply units 1A and signals said voltage drop to the processors 17A and 17B via the control line 11, the clock ratio defining means 35A and 35B reduce the operating clock of the processor cores 34A and 34B. This reduces the power consumption of the processors 17A and 17B, with the result that the remaining functional power supply units 1B and 1C can still supply the computer system 12 with a sufficient operating current. In this case, processes executed on the processor cores 34A and 34B continue to run, albeit at reduced speed, with the result that there is no considerable disruption to the computer system 12.

In addition, the management component 19 detects that one of the power supply units 1A to 1C has failed and, in one advantageous refinement, signals this fault state to the remote maintenance system 16 via the communication apparatus 18 and the data network 15.

The management component 19 may automatically take further measures to reduce the power consumption of the computer unit 14. For example, components which are not absolutely necessary for operating the computer unit 14 can be switched off. In the example illustrated in FIG. 3, a process executed on the second processor core 34B, for example, can be transferred to the processor core 34A of the first processor 17A and the second processor 17B can then be completely switched off. If the power consumption of the computer unit 14 was reduced via these measures or comparable measures to such an extent that a reliable power supply is ensured using the remaining power supply units 1B and 1C, the control signal 11 can be withdrawn and the full internal operating frequency can again be applied to the first processor core 34A which is still operating by the secondary clock generation circuit 35A.

To restore the full performance of the computer system 12, a service engineer called using the remote maintenance system 16 can replace the defective power supply unit 1A and restore a supply of a suitable supply voltage. After the maintenance work has been concluded, the second processor 17B can then be activated again by the management component 19. This may be carried out automatically, for example, by the voltage monitoring circuit 31 automatically detecting a voltage rise on the power supply line 7 and by corresponding program code of the management component 19 or may be initiated manually by the service engineer, for example, via the remote maintenance system 16.

One advantage of the example illustrated in FIG. 3 is that the voltage monitoring 31 in the form of a hardware circuit can react in a particularly rapid manner to failure of one of the power supply units 1A to 1C and can almost immediately reduce the power of the computer unit 14 using a suitable control signal, for example the PROCHOT signal applied to the processors 17A and 17B. There is no need for separate communication or a separate control line between the supply component 13 and the computer unit 14 for this purpose.

Further, complex measures for operating the computer system until a maintenance engineer arrives can be carried out in conjunction with the downstream and possibly slower monitoring and configuration of the computer unit 14 by the management component 19. In particular, the voltage monitoring circuit 31 can be arranged in the vicinity of the processors 17A and 17B and can be dimensioned in such a manner that it already responds before the input voltage tolerance of the processors 17A and 17B has been undershot. Reliable operation of the computer system 12 can thus always be ensured.

Figure 4A:
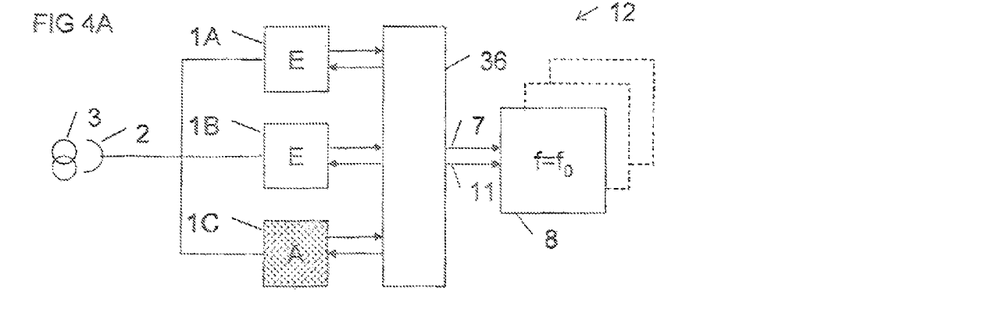
FIG. 4 shows different operating situations of an assembly.
Figure 4B:
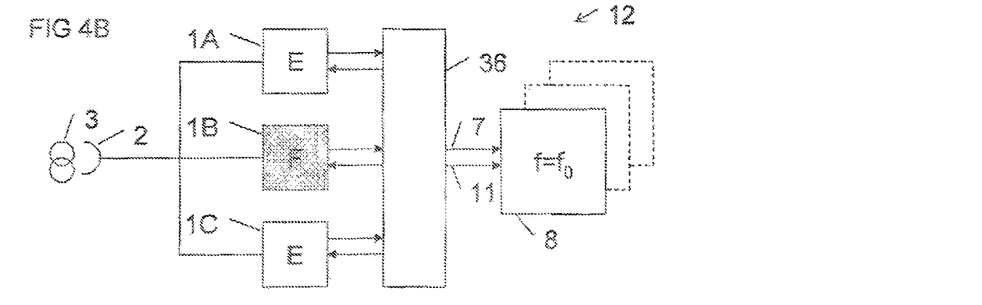
Figure 4C:
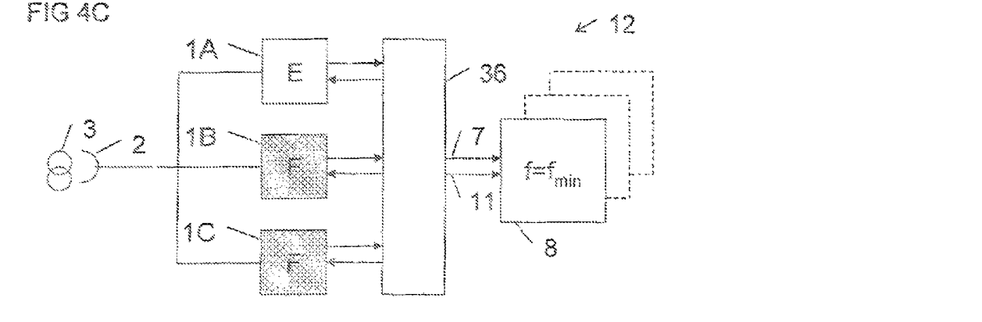

FIGS. 4A to 4C illustrate different operating states of a further computer system 12 having three redundant power supply units 1A to 1C. The power supply units 1A to 1C are connected to a supply voltage 3, for example a mains AC voltage, via a common voltage input 2.

On the output side, the power supply units 1A to 1C are connected to a common control circuit 36 which monitors the operation of the power supply unit 1A to 1C. The control circuit 36 is also set up to deliberately switch the individual power supply units 1A to 1C on and off. For example, a suitable control signal can be transmitted from the control circuit 36 to each individual power supply unit of the power supply units 1A to 1C for this purpose. The power supply units 1A to 1C can be switched off, for example, by interrupting a clock signal for driving a switching converter or by disconnecting the converter circuit from the voltage input 2 by means of an electronic or electromechanical relay.

The control circuit 36 is also connected, via a power supply line 7 and a control line 11, to one or more power-consuming components 8, for example a processor or a so-called "server blade", which can be operated in a normal operating mode and a restricted operating mode.

In the example illustrated, each of the power supply units 1A to 1C has an output power of 50 W, for example. The power-consuming component 8 consumes a power of 100 W, for example, in the normal operating mode. In contrast, the power-consuming component 8 only consumes a power of 50 W in the restricted operating mode.

To ensure particularly efficient operation of the computer system 12, the control circuit 36 generally activates only two of the three available power supply units 1A to 1C. For example, in the situation illustrated in FIG. 4A, the third power supply unit 1C is deactivated, while the power supply units 1A and 1B are activated. The power-consuming component 8 is operated in a normal operating mode, that is to say with full power consumption, in this situation.

In the situation illustrated in FIG. 4B, the second power supply unit 1B has been deactivated as a result of the occurrence of a fault. The control circuit 36 detects the presence of a fault in the second power supply unit 1B and automatically activates the third power supply unit 1C to compensate for the failure of the second power supply unit 1B. The power-consuming component 8 can thus still be operated in the first operating mode with full power even when one of the power supply units 1A to 1C fails.

In the situation illustrated in FIG. 4C, the third power supply unit 1C has also failed in addition to the second power supply unit 1B. In this case, the control circuit 36 cannot compensate for the failure of the further power supply unit 1C. To avoid the only remaining power supply unit 1A from being overloaded, it provides the power-consuming component 8 with a suitable control signal via the control line 11. The power-consuming component 8 is then changed to a restricted operating mode, for example, by reducing an operating frequency f to a minimum operating frequency $f_{min}$, in which operating mode the power consumption of the power-consuming component falls to 50 W. Constant operation of the computer system 12 can thus be ensured even when two of the three power supply units 1A to 1C fail.

As described above, the example illustrated in FIGS. 4A to 4C has a high level of failure safety. At the same time, the three power supply units 1A to 1C can be operated in the vicinity of their maximum output power and thus with the greatest possible efficiency in each of the situations described. In addition, there is no need for each of the power supply units 1A to 1C to be dimensioned in such a manner that they alone can provide the operation of the power-consuming component 8 in the normal operating mode.

The system described with reference to FIGS. 4A to 4C and the control and monitoring apparatus generally described herein are particularly suitable for operating modular server computers. For example, blade servers have a plurality of server blades which are largely independent of one another and have one or more processors arranged on the latter for processing tasks of the computer system. Blade servers likewise generally comprise a plurality of power supply units which can be operated largely independently of one another and provide the operating voltage for the server blades and other installed components. The power consumption of the blade server can be adapted to the available power supply units, by switching off individual processors or server blades or reconfiguring the blade server as a whole, for example, by redistributing the tasks to other server blades, in particular fewer server blades, without questioning the operational reliability of the blade server.

It is pointed out that the illustrated configurations are example assemblies whose features can be combined with one another in virtually any desired manner. Other assemblies having more than two or three power supply units and power-consuming components can also be monitored and controlled in the described manner.

The invention claimed is:

1. An assembly comprising:
a plurality of power supply units that produce an output-side operating voltage from at least one input-side supply voltage,
at least one power-consuming component having at least one normal operating mode with a first power consumption, which is a full power consumption of the power consuming component, and having a restricted operating mode with at least one second power consumption which is lower than the first power consumption, the power-consuming component being electrically coupled to the plurality of power supply units, and the first power consumption of the power-consuming component in the normal operating mode being lower than combined output power of the plurality of power supply units, wherein a first subgroup of power supply units provides power required in the normal operating mode, and a second, smaller subgroup of power supply units provides power required in the restricted operating mode, and
a controller coupled to the plurality of power supply units and the power-consuming component and arranged to monitor at least one function of the plurality of power supply units and deactivate at least one power supply unit if at least one power supply unit is not needed to provide power required in the normal operating mode, the controller consisting of at least one monitoring apparatus in the form of a hardware circuit that generates a pre-determined control signal upon failure of at least one power supply unit and a throttle apparatus which is coupled to the monitoring apparatus and throttles the power-consuming component when the predetermined control signal is generated within milliseconds of failure or exceeding a threshold level, and a switching the power-consuming component from the normal operating mode into the restricted operating mode upon failure of at least one power supply unit in the first subgroup if the combined output power of the remaining power supply units is lower than the first power consumption in the normal operating mode of the power-consuming component and b) activating the at least one deactivated power supply unit upon failure of at least one active power supply unit to supply the power-consuming component with power in the normal operating mode, wherein power consumption of the power-consuming component is at least temporarily reduced.

2. The assembly according to claim 1, wherein the power-consuming component comprises a processor core and the throttle apparatus comprises a clock generation circuit that supplies the processor core with an operating clock, the processor core being supplied with a first operating clock in the normal operating mode by the clock generation circuit and being supplied with a second, lower operating clock in the restricted operating mode.

3. The assembly according to claim 2, wherein the processor core and the clock generation circuit are arranged in a processor, the processor having at least one connection pin (PROCHOT) that applies the predetermined control signal.

4. The assembly according to claim 1, wherein each of the at least two power supply units comprises a monitoring apparatus which monitors a permissible output power or a permissible output current and generates the predetermined control signal upon detecting that the permissible output power or the permissible output current has been exceeded.

5. The assembly according to claim 1, wherein the at least one monitoring apparatus has a voltage monitoring circuit which compares the output-side operating voltage with a predetermined threshold value and generates the predetermined control signal when the predetermined threshold value is undershot.

6. A computer system comprising:
at least one assembly according to claim 1; and
at least one management component coupled to the controller and signals a fault state when at least one power supply component fails.

7. The computer system according to claim 6, wherein the management component can be coupled to a remote maintenance system via a communication apparatus and signals the fault state to the remote maintenance system.

8. The computer system according to claim 7, wherein the management component changes a configuration of the computer system upon signaling the fault state to reduce power consumption of the computer system.

9. The computer system according to claim 6, wherein the management component changes a configuration of the computer system upon signaling the fault state to reduce power consumption of the computer system.

10. The computer system according to claim 9, wherein the management component resets the controller after changing the configuration to switch the power-consuming component back from the restricted operating mode into the normal operating mode.

11. The assembly according to claim 1, wherein the controller comprises at least one monitoring apparatus that generates a predetermined control signal upon failure of at least one power supply unit and a throttle apparatus coupled to the monitoring apparatus and throttles the power-consuming component when the predetermined control signal is received.

12. A method of controlling an assembly having a power-consuming component and a plurality of power supply units that provide an operating voltage for the power-consuming component, a first power consumption of the power-consuming component in a normal operating mode, which is a full power consumption of the power consumption component, being lower than the combined output power of the plurality of power supply units, wherein a first subgroup of power supply units provides power for the normal operating mode, and a second, smaller subgroup of power supply units provides power for the restricted operating mode, comprising:
  deactivating at least one power supply unit if the power supply unit is not needed to provide power required in the normal operating mode,
  monitoring the plurality of power supply units for failure by at least one monitoring apparatus, causing the at least one monitoring apparatus that consists of at least one monitoring apparatus comprising a hardware circuit that generates a pre-determined control signal upon failure of at least one power supply unit and a throttle apparatus which is coupled to the monitoring apparatus and throttles the power-consuming component when the predetermined control signal is generated within milliseconds of failure or exceeding a threshold level, and
  switching the power-consuming component from the normal operating mode with the first power consumption into a restricted operating mode with a second, lower power consumption if the predetermined control signal has been detected and combined output power of the remaining power supply units is lower than the first power consumption in the normal operating mode of the power-consuming component, activating the at least one deactivated power supply unit upon failure of at least one active power supply unit to supply the power-consuming component with power in the normal operating mode, wherein power consumption of the power-consuming component is at least temporarily reduced.

13. The method according to claim 12, further comprising changing configuration of a computer system comprising the assembly if the predetermined control signal has been detected.

14. The method according to claim 13, further comprising switching the power-consuming component back from the restricted operating mode into the normal operating mode after the configuration has been changed.

15. The method according to claim 12, further comprising switching the power-consuming component back from the restricted operating mode into the normal operating mode if the at least one monitoring component has detected that the at least one previously failed power supply unit is ready for operation again.

16. The method according to claim 12, further comprising:
  activating the at least one deactivated power supply unit when at least one active power supply unit fails to supply the power-consuming component with power for the normal operating mode, and
  switching the consuming component back from the restricted operating mode into the normal operating mode.

* * * * *